US008413683B2

(12) United States Patent
Herges et al.

(10) Patent No.: US 8,413,683 B2
(45) Date of Patent: Apr. 9, 2013

(54) PNEUMATIC CONTROL VALVE DEVICE FOR AIR-SUSPENDED VEHICLES, WITH MECHANICAL RETURN OF THE CONTROL ELEMENT

(75) Inventors: Michael Herges, Munich (DE); Friedbert Roether, Cleebronn (DE); Martin Mederer, Munich (DE); Janos Toth, Kecskemét (HU)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/449,429

(22) PCT Filed: Feb. 7, 2008

(86) PCT No.: PCT/EP2008/000938
§ 371 (c)(1),
(2), (4) Date: Oct. 21, 2009

(87) PCT Pub. No.: WO2008/095704
PCT Pub. Date: Aug. 14, 2008

(65) Prior Publication Data
US 2010/0032599 A1     Feb. 11, 2010

(30) Foreign Application Priority Data
Feb. 7, 2007   (DE) .......................... 10 2007 005 979

(51) Int. Cl.
*F16K 11/074* (2006.01)
(52) U.S. Cl.
USPC .................... 137/625.21; 280/6.157; 251/297
(58) Field of Classification Search ............. 137/625.21; 251/297; 280/6.153, 6.157, 5.515, 5.519
See application file for complete search history.

(56) References Cited

U.S. PATENT DOCUMENTS 3,096,788 A * 7/1963 Talbot et al. ............. 137/625.11
3,405,734 A * 10/1968 Smit et al. ................ 137/625.46
(Continued)

FOREIGN PATENT DOCUMENTS

DE      2623235       4/1978
DE      4202729       1/1993
(Continued)

OTHER PUBLICATIONS

European Patent Office, International Preliminary Report on Patentability, Sep. 24, 2009, from International Patent Application No. PCT/EP2008/000938, filed on Feb. 7, 2008.

(Continued)

*Primary Examiner* — John K Fristoe, Jr.
*Assistant Examiner* — Time Aigbe
(74) *Attorney, Agent, or Firm* — Kenyon & Kenyon LLP

(57) ABSTRACT

A pneumatic control valve device for systems for arbitrarily lifting and lowering the vehicle body of air-suspended vehicles, with a control device having at least one mechanical control element for the positions lift, lower, drive and stop, and with a spring device for returning the control element after it has been released, in which the spring device returns the control element after it has been released into the drive position, a position securing device is provided, the position securing device mechanically locking the control element, the position securing device, in the locked state, preventing the control element from returning under the spring force of the spring device into the drive position, but permitting this in the unlocked state, however always permitting the control element to be manually adjusted, the position securing device can be changed from the locked state into the unlocked state by an electric signal.

8 Claims, 4 Drawing Sheets

U.S. PATENT DOCUMENTS

| | | | | |
|---|---|---|---|---|
| 3,917,295 A | * | 11/1975 | Hiruma | 280/5.507 |
| 4,455,922 A | * | 6/1984 | Brelsford et al. | 91/358 A |
| 5,582,206 A | * | 12/1996 | Brillant | 137/625.21 |

FOREIGN PATENT DOCUMENTS

| | | |
|---|---|---|
| DE | 19740392 | 3/1999 |
| DE | 199 13 380 | 5/2000 |
| DE | 19913380 | 5/2000 |
| DE | 102005017590 | 6/2006 |
| DE | 102006017890 | 10/2006 |
| EP | 1 039 147 | 3/2000 |
| FR | 2733942 | 11/1996 |
| WO | 91/06440 | 5/1991 |
| WO | 91/07291 | 5/1991 |
| WO | 92/12021 | 7/1992 |
| WO | 2007/093251 | 8/2007 |

OTHER PUBLICATIONS

European Patent Office, Translation of International Preliminary Report on Patentability, Dec. 30, 2009, from International Patent Application No. PCT/EP2008/000938, filed on Feb. 7, 2008.

NORGREN Brass Ball Valves Product Brochure, N/UK 5.10.041.02.

WABCO TASC—Trailer Air Suspension Control Brochure, 8200020 002 3., Sep. 2006.

Product description of Rotary Slide Valve, 463 032/1/01.99, http://www.wabcoauto.com/uploads/media/Technical_Documentation.pdf.

Opposition filed against European Patent EP2117854 by Wabco GmbH, dated Nov. 9, 2011.

Opposition filed against European Patent EP1808164 by Haldex Brake Products GmbH, dated May 4, 2011.

* cited by examiner

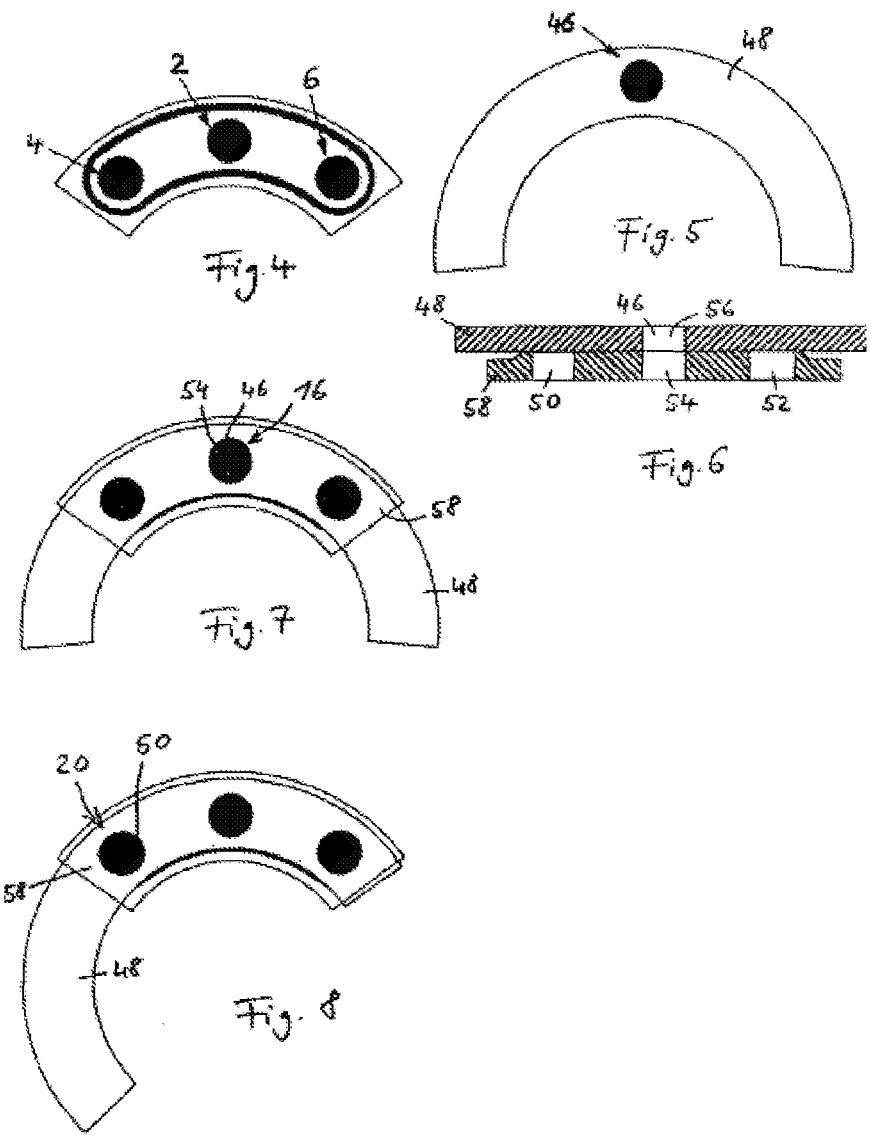

PNEUMATIC CONTROL VALVE DEVICE FOR AIR-SUSPENDED VEHICLES, WITH MECHANICAL RETURN OF THE CONTROL ELEMENT

FIELD OF THE INVENTION

The invention is to a pneumatic control valve device for systems for arbitrarily lifting and lowering the vehicle body of air-suspended vehicles, with a control device having at least one mechanical control element for the positions lift, lower, drive and stop, and with a spring device for returning the control element after it has been released.

BACKGROUND INFORMATION

Air-suspended vehicles with a level control system customarily have a compressed air store, a level control valve for the automatic, load-dependent adjustment of the vehicle level, air spring bellows assigned to at least one vehicle axle, and a control valve device for manually adjusting the level of the vehicle body bypassing the level control valve. A control valve device of this type generally has a shut-off valve installed with the air spring bellows in a line connection of the level control valve, and an inlet valve and an outlet valve for manually admitting air to and discharging air from the air spring bellows.

In other words, in addition to the level control valve which adjusts the level of a trailer platform or of a trailer frame to a constant value in a known manner, air suspension devices having air spring bellows are provided with a manually actuatable control valve device by which an operator, bypassing the level control valve, can set a desired level position of the trailer platform or of the vehicle body. For this purpose, the level control valve unit is set manually into the positions "lift", "lower" or "stop". For this purpose, the control valve device has a control element generally in the form of a manual actuation arrangement with which, for example, a level position desirable for loading the vehicle on a loading ramp can be set. Furthermore, there has to be a "drive" position in which the level control valve becomes effective again.

A control valve device of the type in question is discussed, for example, in German patent document DE 41 20 824 C1. The control valve device has a selector shaft which, by pressurization of a control piston, can be displaced axially between the stop and drive positions and, by rotation out of the stop position, actuates the inlet valve for the lifting or the outlet valve for the lowering. The inlet valve, the outlet valve and the shut-off valve are arranged in different axial planes of the selector shaft. By pressurization of the control piston with compressed air, the control valve device can be transferred into the drive position. The spring arrangement returns the control element in the form of a hand lever into the stop position.

SUMMARY OF THE INVENTION

By contrast, the exemplary embodiments and/or exemplary methods of the present invention is based on the object of developing a control valve of the type mentioned at the beginning in such a manner that it is constructed more simply and can be manufactured more cost-effectively.

This object may be achieved according to the features of described herein.

According to the exemplary embodiments and/or exemplary methods of the present invention:

a) the spring device returns the control element after it has been released into the drive position,
b) a position securing device is provided, said position securing device mechanically locking the control element, said position securing device, in the locked state, preventing the control element from returning under the spring force of the spring device into the drive position, but permitting this in the unlocked state, however always permitting the control element to be manually adjusted,
c) the position securing device can be changed from the locked state into the unlocked state by an electric signal, and the control lever is returned into the drive position electromechanically.

Accordingly, the complicated pneumatic return in the prior art with a control piston and pneumatic tube work necessary for this purpose can be omitted, thus resulting in a simpler and more cost-effective construction.

This is because the operator tensions the spring device by manipulating the control element out of the drive position. A mechanical resistance, in particular a latching device, prevents the control element, which is in the lowering position, for example, from automatically returning back into the drive position. This mechanical resistance has to be of a size sufficient to prevent the control element from automatically returning into the drive position under the spring forces of the spring device, and the operator also has to be able always to displace the control lever counter to the mechanical resistance. Said mechanical resistance is reduced or switched off by the electric signal generated, for example, as a function of a critical speed being reached or by the actuation of a braking device, in particular an antilock braking system of the vehicle such that the spring device can return the control element back into the drive position.

Advantageous developments and improvements of the exemplary embodiments and/or exemplary methods of the present invention are described herein.

The position securing device particularly may contain a latching device by which the position of the control element can be latched in relation to a stationary unit.

According to a development, the latching device can contain at least one bolt which can be brought into alignment with latching openings in a latching body, said latching openings representing at least the positions drive, lift, lower and stop of the control lever, and can be at least partially latched into said latching openings and is spring-loaded in the direction thereof.

The latching device furthermore may contain an electric actuator which is controlled directly or indirectly by an electric signal, wherein the electric signal is generated as a function of the speed and/or a braking actuation of the vehicle. The electric actuator may be accommodated in the stationary unit.

The at least one bolt can then be actuated counter to the spring force of a spring device by the electric actuator, such as a solenoid, a piezo valve, a heatable bimetal or an electric motor, in order to undo the latching. Such an electric actuator is generally more cost-effective than the pneumatic actuator in the prior art.

A particularly simple construction is produced if, by the control element, a bellows air duct connected to at least one air spring bellows can be brought together with a closure element relative to mouths of air ducts, which are formed in the unit and are connected either to a level control valve, a compressed air store or to an air discharging arrangement, into positions permitting an air flow between the bellows air duct and a choice of one of the air ducts and at the same time closing the mouths of the other air ducts. This is because the valve control functions of lift, lower, drive and stop are realized merely by the bellows air duct being covered or not covered by the mouths of the air ducts in the unit, a covering of the bellows air duct with one of the air ducts signifying the execution of a certain control function, for example lifting and at the same time shutting off of the other air ducts and therefore also of the other functions.

In particular, the functions of an inlet valve for the lifting, an outlet valve for the lowering and a shut-off valve for the drive may be realized by plate-like bodies which are tightly in contact with each other, but are displaceable linearly, rotationally or in any way in relation to each other and in which mouths of air ducts, the mouths representing the functions, are formed.

Such kinematics can be realized in a simple manner, which may be by the control element being actuated together with the bellows air duct and the closure element in a rotational manner with respect to a pivot axis, and the latching openings in the latching body and the mouths of the air ducts each being arranged on the circumference of an imaginary circular line about said pivot axis.

The closure element can then include an annular body which can be pivoted with the control element about the pivot axis and has a passage opening into which the bellows air duct leads. Not least, the mouths of the air ducts are arranged on an annular body which is supported by the unit, which may be on an imaginary circular line about the pivot axis, which line coincides with the imaginary circular path along which the passage opening moves in the annular body for the bellows air duct during the rotational actuation of the control element.

The latching body particularly may also contain an annular body which is pivoted together with the control element about the pivot axis and in which the latching openings are formed.

If the annular body with the passage opening for the bellows air duct and the annular body with the latching openings then each form annular segments which are arranged substantially in a plane perpendicular to the pivot axis, a very compact control valve device is produced.

More precise details emerge from the description below of an exemplary embodiments.

In the following, an exemplary embodiment of the invention is illustrated in the drawing and explained in more detail in the description below.

BRIEF DESCRIPTION OF THE DRAWINGS

FIG. 4 shows a top view of a unit of the control valve device from FIG. 1 with air duct mouths formed in an annular body of the unit.

FIG. 5 shows a top view of an annular body with a passage opening for a bellows air duct.

FIG. 6 shows a cross sectional illustration of the annular body from FIG. 4 interacting with the annular body from FIG. 5.

FIG. 7 shows a top view of the annular body as per FIG. 5 interacting with the annular body from FIG. 4 in the drive position.

FIG. 8 shows a top view of the annular body from FIG. 5 interacting with the annular body from FIG. 4 in the lift position.

DETAILED DESCRIPTION

Figure 1:
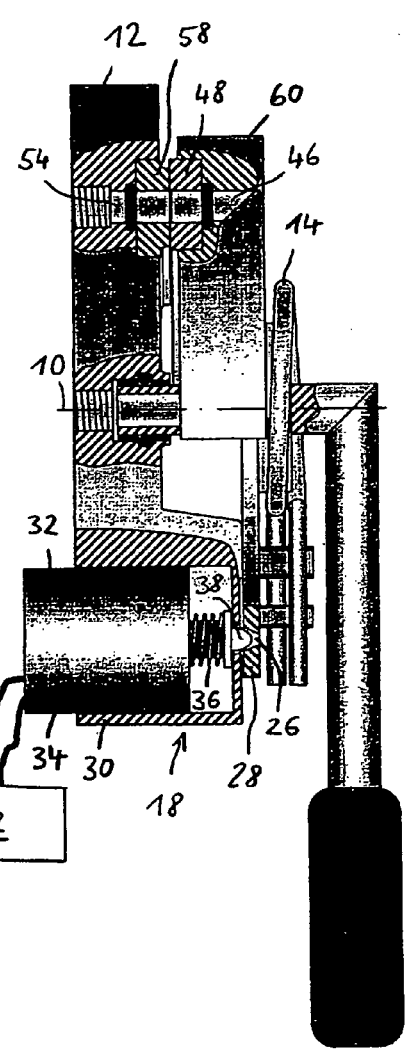
FIG. 1 shows a partially cut-open side view of a pneumatic control device according to an exemplary embodiment of the invention.
Figure 3:
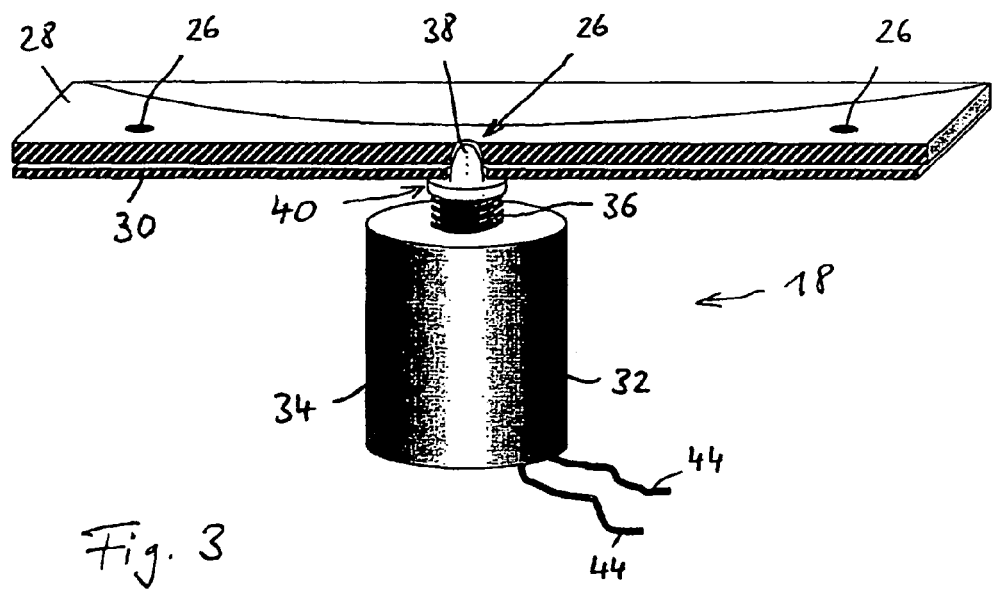
FIG. 3 shows a perspective view of a latching device of the control valve device from FIG. 1.

FIG. 1 shows a partially cut-open side view of a pneumatic control device 1 according to an exemplary embodiment of the invention, said control device being part of a level control system of an air-suspended vehicle. A level control system of this type customarily has a compressed air supply, a level control valve for the automatic, load-dependent adjustment of the vehicle level, air spring bellows assigned to at least one vehicle axle, and the control valve device 1 for the manual adjustment of the level of the vehicle body bypassing the level control valve.

Figure 2:
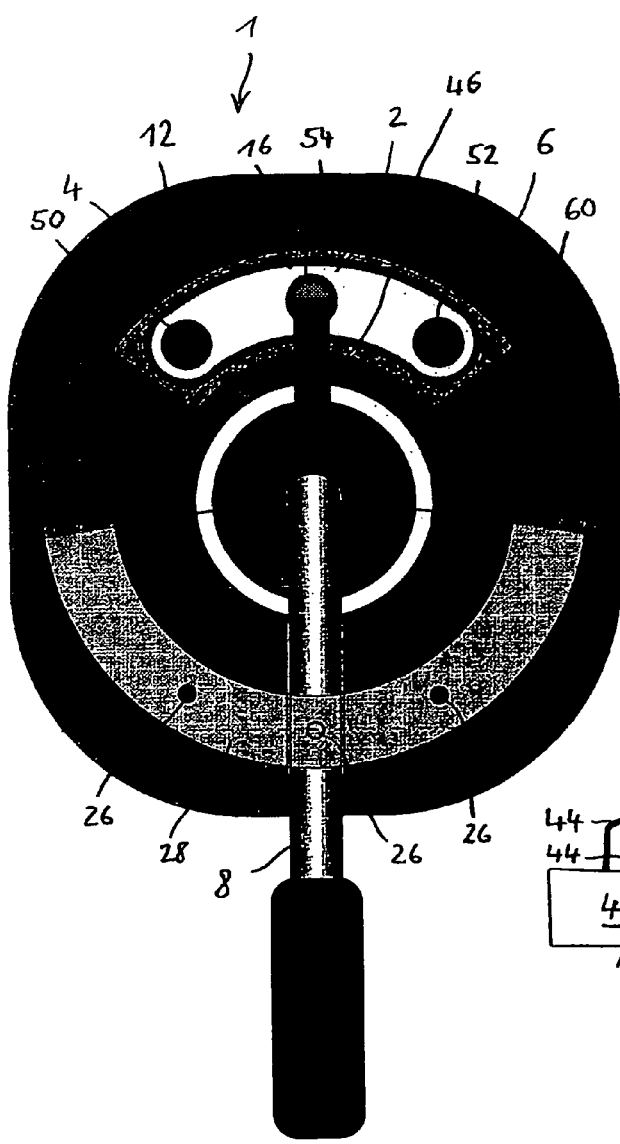
FIG. 2 shows a top view of the control device from FIG. 1.

Such a control valve device 1 comprises a shut-off valve 2 installed with the air spring bellows in a line connection of the level control valve, and an inlet valve 4 and an outlet valve 6 for admitting air to and discharging air from the air spring bellows, as can best be seen in FIG. 2. Furthermore, there is a mechanical control element for the control valve device 1, here in the form of a control lever 8 which is bent through 90° and the base part of which is rotationally mounted as a pivot axis 10 in a unit 12 which can be pivoted into the positions lift, lower, drive and stop (see FIG. 7 to FIG. 11). Furthermore, a spring device 14 acts on the control lever 8, said spring device engaging on one side on the control lever 8 and on the other side on the unit 12, being relaxed in what may be central neutral or drive rotational position 16, shown in FIG. 2, and being tensioned by pivoting in both directions out of the neutral or drive position 16 such that the control lever, after being released, pivots back into the neutral or drive position 16.

Not least, a position securing device 18 mechanically engaging directly or indirectly on the control lever 8 is provided in such a manner that, in the locked state, it prevents the control lever 8 from returning into the neutral or drive position 16 under the spring force of the spring device 14 but permits this in the unlocked state, however always permitting the control lever 8 to be manually adjusted. The position securing device 18 can be changed from the locked state into the unlocked state by an electric signal.

The position securing device 18 contains a mechanical resistance, in particular in the form of a latching device, which prevents the control lever 8, which is in, for example, the stop position, from automatically passing back again into the neutral or drive position 16. This mechanical resistance has to be of a size sufficient to prevent the control lever 8 from returning into the drive position 16 under the spring forces of the spring device 14, but an operator has to be able always to displace the control lever 8 counter to the mechanical resistance. Said mechanical resistance is reduced or switched off by an electric signal which is generated as a function of a critical speed being reached or of a braking actuation of the vehicle, in particular an antilock braking system (ABS) of the vehicle such that the spring device 14 can return the control lever 8 back into the drive position 16.

The position of the control lever 8 can be latched in relation to the stationary unit 12 by the latching device 18. Said latching device 18 contains at least one bolt 38 which can be brought into alignment with latching openings 26 in a latching body 28, said latching openings representing at least the positions drive 16, lift 20, lower 22 or stop of the control lever 8, and can be at least partially latched into said latching openings 26 and is spring-loaded in the direction thereof. The latching body may be formed by an annular body 28 which is pivoted together with the control lever 8 about the pivot axis 10 and in which the latching openings 26 may be formed equidistantly on an imaginary circular line about the pivot axis 10.

The position securing device may also contain an electric actuator 32 which is accommodated in a housing 30 of the unit 12 and, as a function of the electric signal, controls the bolt 38 which interacts with a solenoid 34 and is loaded into an extended position by a spring 36. In the extended position, the bolt 38 protrudes through a passage opening 40 in the housing 30 of the unit 12 and projects outward for a distance beyond the housing 30 in order to be able to project into one of the latching openings 26.

The bolt 38 of the latching device 18 could also be controlled by any actuator actuatable by an electric signal, such as, for example, a piezo valve, a heatable bimetal or an electric motor, instead of by a solenoid 34.

The electric signal may be supplied from the ABS of the vehicle to a control device 42 for the electric actuator 32, said control device generating the control signals for the actuator 32 as a function of said signal. In the initial state, i.e. when the vehicle is in motion, the control lever 8 has to be in the central neutral or drive position 16 such that the electric signal generated by the ABS during a braking operation ensures that the bolt 38 returns into the retracted state. For this purpose, after the ABS has generated the electric signal, which may be a pulse signal, the bolt 38 is pulled back by the magnetic forces of the solenoid 34, which in this case is energized by the control device 42, into the retracted position counter to the action of the spring force of the spring 36. For this purpose, the solenoid 34 is connected by electric cables 44 to the control device 42 which, on the basis of the pulse signal from the ABS, causes the solenoid 34 to be energized for a period of time sufficient in order to release the control lever 8, by the bolt 38 being pulled back, and therefore the control lever 8 can pivot back out of one of the positions lift 20, lower 22 or stop 24 into the neutral or drive position 16, as is easily conceivable with reference to FIG. 1 and FIG. 2.

The shut-off valve 2, the inlet valve 4 and the outlet valve 6 are integrated in the control valve device 1 and contain mouths of air ducts 50, 52 and 54 which are conductively connected to the compressed air store (lifting), an air discharge arrangement (lowering) and to the level control valve (drive) (FIG. 6). The control lever 8 may be pivoted together with a bellows air duct 46, which is connected to at least one air spring bellows, and a closure element 48 in a rotational manner on a circular path about the pivot axis 10 in a plane perpendicular thereto. By contrast, the latching openings 26 and the mouths of the air ducts 50, 52, 54 are likewise each arranged on the circumference of an imaginary circular line about said pivot axis 10.

The closure element can comprise an annular segment 48 which can be pivoted with the control lever 8 about the pivot axis 10 and has a central passage opening 56 into which the bellows air duct 46 leads, as FIG. 5 and FIG. 6 show. Not least, the mouths of the air ducts 50, 52 and 54 may lie on an annular segment 58, which is shown in section in FIG. 6 and is held in the unit 12, equidistantly on an imaginary circular line about the pivot axis 10, said circular line overlapping with the circular path along which the passage opening 56 for the bellows air duct 46 moves in the annular segment 48 during the rotational actuation of the control lever 8.

By a rotational actuation of the control lever 8, the bellows air duct 46, which is connected to the at least one air spring bellows, can then be brought together with the closure element 48 into positions permitting an air flow between the bellows air duct 46 and a choice of one of the air ducts 50, 52 or 54 and at the same time closing the mouths of the other air ducts 50, 52 or 54 by the closure element 48, as is shown best in FIG. 6. This is because the valve control functions of lift, lower, drive and stop are realized merely by the bellows air duct 46 being covered or not covered by the mouths of the air ducts 50, 52 or 54 in the unit 12, a covering of the bellows air duct 46 by one of the air ducts 50, 52 or 54 signifying the execution of a certain control function, for example lifting and at the same time shutting off of the other air ducts 50, 52 or 54 and therefore also of the other functions.

The shut-off function of the shut-off valve 2 is then obtained by the annular body 48 being rotated into a position deviating from an alignment of the bellows air duct 46 with the air duct 55. In an analogous manner, said shut-off valve 2 permits air to flow from the level control valve to the air spring bellows when the aligned position between the bellows air duct 46 and the air duct 54, which position is shown in FIG. 1, FIG. 2, FIG. 6 and FIG. 7, is reached.

Similarly, compressed air is conducted out of the compressed air store via the air duct 50 and the bellows air duct 46 to the air spring bellows in the lift function shown in FIG. 8 when the inlet valve 4 is in an open position by the bellows air duct 46 being covered by the air duct 50.

Figure 10:
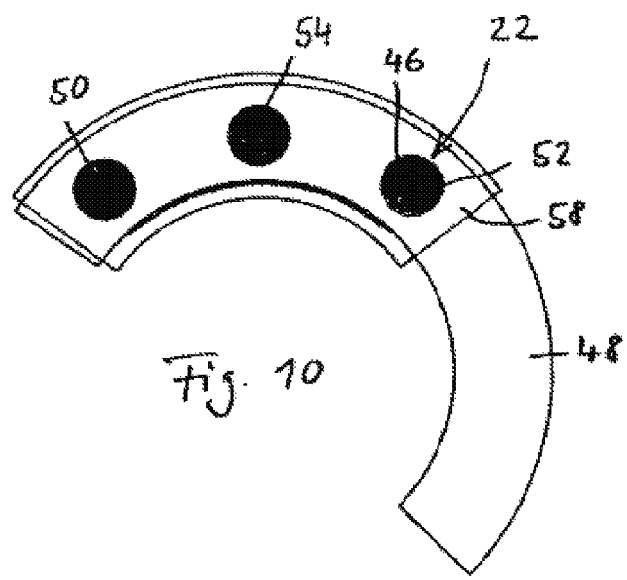
FIG. 10 shows a top view of the annular body as per FIG. 5 interacting with the annular body from FIG. 4 in the lower position.

If, by contrast, the annular body 48 is rotated together with the bellows air duct 46 into the lowering position shown in FIG. 10 by the control lever 8, the inlet valve is closed by the annular body 48, but the outlet valve 6 is opened because the bellows air duct 46 is aligned with the air duct 52, leading to air being discharged.

The functions of the inlet valve 4, the outlet valve 6 and the shut-off valve 2 are consequently realized by what may be plate-like bodies 48, 50 which are tightly in contact with each other, but can be displaced in relation to each other and in which mouths of air ducts, the mouths representing the functions, are formed.

FIG. 6 illustrates by way of example the neutral or drive position 16 of the two annular segments 48 and 58 which may be arranged one above the other essentially without a gap for tightness reasons, the mouth of the bellows air duct 46 being aligned with the mouth of the air duct 54 in the unit 12, said air duct leading to the level control valve, while the mouths of the air ducts 50, 52 which lead to the compressed air store and to the air discharging arrangement are closed by the annular segment 48 forming the closure element. In this case, the air spring bellows are supplied via the bellows air duct 46 with the air flow originating from the level control valve in order to keep the level of the vehicle body constant irrespective of the load.

The annular segment 48 with the passage opening 56 for the bellows air duct 46 and the annular segment 28 with the latching openings 26 may be arranged substantially in a plane perpendicular to the pivot axis 10 and together form an angle of less than or equal to 360°. The annular segments 48 and 58 may be composed of ceramic and are held as inserts in the unit 12 or in what may be a semicircular pivoting body 60 which is connected to the control lever 8.

Figure 9:
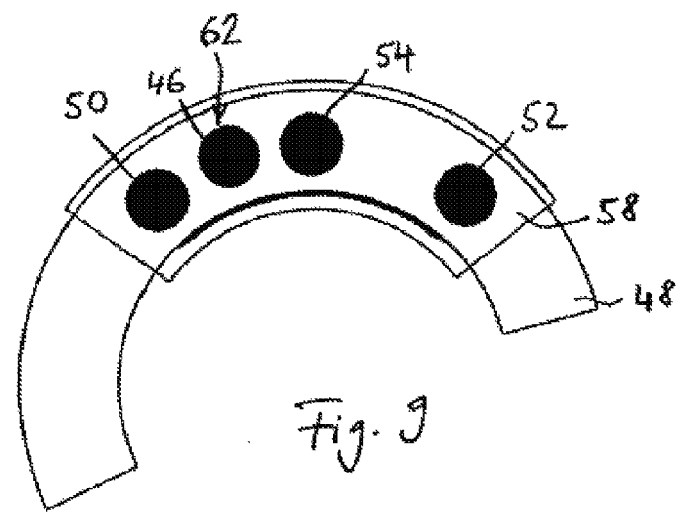
FIG. 9 shows a top view of the annular body as per FIG. 5 interacting with the annular body from FIG. 4 in the stop position.
Figure 11:
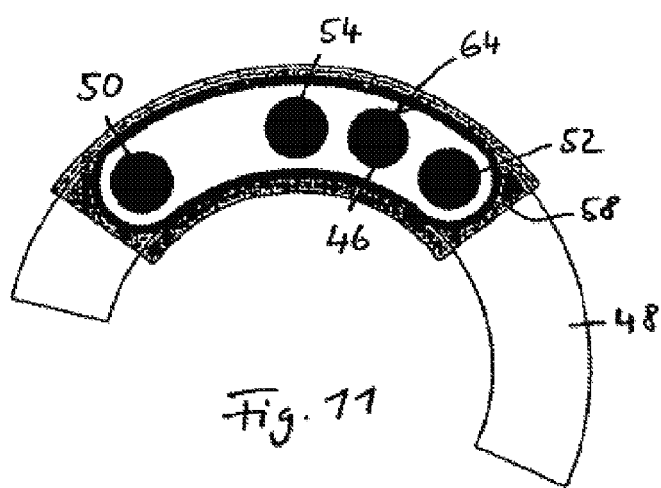
FIG. 11 shows a top view of the annular body as per FIG. 5 interacting with the annular body from FIG. 4 in the stop position.

As emerges in particular from FIG. 9 and FIG. 11, between the positions lower 22 and neutral or drive 16 and the positions lift 20 and neutral or drive 16 there is a respective stop position 62, 64 into which the control lever 8 can be latched by the latching device 18. In said stop positions 62, 64, the control lever 8 with the annular segment 48 and the passage opening 56 for the bellows air duct 46 takes up a pivoted position in which the mouth of the bellows air duct 46 is not aligned with any of the mouths of the air ducts 50, 52 or 54, and therefore the bellows air duct 46 and the air ducts 50, 52 and 54 are closed. The stop positions 62 and 64 therefore interrupt a further supply of air into the bellows air duct 46 during the lifting or a further removal of air from the bellows air duct 46 during the lowering, by the airways being shut off, such that the vehicle body level finally set is retained.

It is clear that, instead of the described rotational kinematics of the control valve device 1, it is also possible for the latter to have linear kinematics, for example by being designed as a linear sliding valve design. A further example of rotational kinematics of the control valve device 1 is a radial rotary sliding valve device which likewise lies within the scope of the exemplary embodiments and/or exemplary methods of the present invention.

A list of the reference numbers is as follows:
1 Control device
2 Shut-off valve
4 Inlet valve
6 Outlet valve
8 Control lever
10 Pivot axis
12 Unit
14 Spring device
16 Drive position
18 Position securing device
20 Lift
22 Lower
26 Latching openings
28 Annular body
30 Housing
32 Actuator
34 Solenoid
36 Spring
38 Bolt
40 Passage opening
42 Control device
44 Cable
46 Bellows air duct
48 Closure element (annular body)
50 Air duct
52 Air duct
54 Air duct
56 Passage opening
58 Annular body
60 Pivoting body
62 Stop position
64 Stop position

The invention claimed is:

1. A pneumatic control valve device for a system for arbitrarily lifting and lowering a vehicle body of an air-suspended vehicle, comprising: control device having at least one mechanical control element having a lift position, a lower position, a drive position and a stop position; and a spring device for returning the at least one mechanical control element after it has been released, wherein the spring device returns the control element after it has been released into the drive position; a position securing device to mechanically lock the control element, wherein the position securing device, in a locked state, prevents the control element from returning under the spring force of the spring device into the drive position, permitting this in an unlocked state, and always permitting the control element to be manually adjusted, and wherein the position securing device can be changed from the locked state into the unlocked state by an electric signal; wherein, by the control element, a bellows air duct connected to at least one air spring bellows can be brought together with a closure element relative to mouths of air ducts, which are formed in the unit and are connected to one of a level control valve, a compressed air store and an air discharging arrangement, into positions permitting an air flow between the bellows air duct and a choice of one of the air ducts and at the same time closing the mouths of the other air ducts by the closure element, wherein the control element is actuated together with the bellows air duct and the closure element in a rotational manner with respect to a pivot axis, and latching openings in a latching body and the mouths of the air ducts are each arranged on a circumference of an imaginary circular line about the pivot axis, wherein the closure element is formed by an annular body which can be pivoted with the control element about the pivot axis and has a passage opening into which the bellows air duct leads, and wherein the mouths of the air ducts lie on an imaginary circular line about the pivot axis, and wherein the circular line coincides with an imaginary circular path along which the passage opening moves in the annular body for the bellows air duct during the rotational actuation of the control element, and wherein the annular body with the passage opening for the bellows air duct and the annular body with the latching openings each form annular segments which are arranged substantially in a plane perpendicular to the pivot axis.

2. The pneumatic control valve device of claim 1, wherein the position securing device includes a latching device by which the position of the control element can be latched in relation to a stationary unit.

3. The pneumatic control valve device of claim 2, wherein the latching device includes at least one bolt which can be brought into alignment with latching openings in the latching body, the latching openings representing at least the drive position, the lift position, the lower position and the stop position of the control lever, and wherein the latching device can be at least partially latched into the latching openings and is spring-loaded in a direction of the latching openings.

4. The pneumatic control valve device of claim 3, wherein the position securing device includes an electric actuator, and wherein the electric signal is generated as a function of at least one of a speed and a braking actuation of the vehicle.

5. The pneumatic control valve device of claim 2, wherein the electric actuator is in the stationary unit.

6. The pneumatic control valve device of claim 4, wherein the at least one bolt is actuated counter to a spring force of the spring device by the electric actuator, which includes at least one of a solenoid, a piezo valve, a heatable bimetal, and an electric motor.

7. The pneumatic control valve device of claim 1, wherein the latching body includes the annular body which can be pivoted together with the control element about the pivot axis and in which the latching openings are formed.

8. The pneumatic control valve device of claim 1, wherein the functions of an inlet valve for the lifting, an outlet valve for the lowering and a shut-off valve for the drive may be plate-like bodies which are tightly in contact with each other, but are displaceable linearly, rotationally, or in another manner in relation to each other and in which mouths of air ducts, the mouths representing the functions, are formed.

* * * * *

UNITED STATES PATENT AND TRADEMARK OFFICE
CERTIFICATE OF CORRECTION

PATENT NO.      : 8,413,683 B2                                                Page 1 of 1
APPLICATION NO. : 12/449429
DATED           : April 9, 2013
INVENTOR(S)     : Herges et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 663 days.

Signed and Sealed this

First Day of September, 2015

Michelle K. Lee
*Director of the United States Patent and Trademark Office*